US007085629B1

(12) United States Patent
Gotou et al.

(10) Patent No.: US 7,085,629 B1
(45) Date of Patent: Aug. 1, 2006

(54) SYSTEM FOR TRANSMITTING AND RECEIVING ELECTRONIC MAIL CONTAINING LOCATION INFORMATION

(75) Inventors: Shinichirou Gotou, Wako (JP); Takeshi Imai, Wako (JP); Masayuki Ikegami, Wako (JP); Hideshi Sawada, Wako (JP); Toshihide Youfu, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/124,754

(22) Filed: Jul. 29, 1998

(30) Foreign Application Priority Data

Jul. 31, 1997 (JP) .................................. 9-206960

(51) Int. Cl.
*G05D 1/00* (2006.01)
*G01C 22/00* (2006.01)
*G06F 15/16* (2006.01)

(52) U.S. Cl. .............................. 701/1; 701/23; 701/24; 709/203

(58) Field of Classification Search ........... 395/200.36; 709/218, 100–108, 200, 203; 345/751; 701/208, 701/200, 1, 23–24; 718/100–108
See application file for complete search history.

(56) References Cited

U.S. PATENT DOCUMENTS

| 5,559,707 A | * | 9/1996 | DeLorme et al. | 701/200 |
| 5,664,126 A | * | 9/1997 | Hirakawa et al. | 345/751 |
| 5,930,474 A | * | 7/1999 | Dunworth et al. | 709/217 |
| 5,983,161 A | * | 11/1999 | Lemelson et al. | 701/301 |
| 6,028,537 A | * | 2/2000 | Suman et al. | 340/988 |
| 6,209,026 B1 | * | 3/2001 | Ran et al. | 709/218 |
| 2002/0044067 A1 | * | 4/2002 | Ilcisin | 340/825.49 |

FOREIGN PATENT DOCUMENTS

| JP | 7-028813 | | 1/1995 |
| JP | 200375527 A | * | 12/1996 |
| JP | 09-231263 | | 9/1997 |
| JP | 10-107833 | | 4/1998 |
| JP | 10-134042 | | 5/1998 |
| JP | 2003075527 A | * | 3/2003 |

OTHER PUBLICATIONS

Stig Arne Bye, "GPS and email—New product from Magellian", Newsgroups: rec.sport.snowmobiles, Jan. 11, 1997.*

* cited by examiner

*Primary Examiner*—Meng-Al T. An
*Assistant Examiner*—Kenneth Tang
(74) *Attorney, Agent, or Firm*—Arent Fox PLLC

(57) ABSTRACT

The system for transmitting and receiving electronic mail of the present invention, comprises: a text input means for entering a text of the electronic mail to be transmitted; an extracting means for extracting a character string to specify a place from the text inputted by the text input means; an adding means for adding information to the electronic mail, the information corresponding to the place specified by the extracted character string; a text display means for displaying the text in the electronic mail; and a map display means for displaying map information indicating the specified place corresponding to the information added to the electronic mail.

15 Claims, 9 Drawing Sheets

FIG.5

A {
Please come to my house.
My address is House No. 1, First Street, Green City,
West Prefecture, Japan
}

B {
```
<NAVIDATA>
name="ooooo@xxxx.or.jp",
        1
position-latitude=3120982,
                  2
position-longitude=4400352,
                   3
</NAVIDATA>
```
}

FIG.6

Please come to my house.
My address is House No. 1, First Street, Green City,
West Prefecture, Japan [MAP]

SYSTEM FOR TRANSMITTING AND RECEIVING ELECTRONIC MAIL CONTAINING LOCATION INFORMATION

BACKGROUND OF THE INVENTION

1. Field of the Invention

The present invention relates to a system for transmitting and receiving electronic mail which displays map information corresponding to a place name included in transmitted electronic mail, on a receiver communication terminal.

2. Background Art

Systems with communication terminals installed in mobile stations or in fixed stations that transmit location information of a station to another station and display the location on a displayed map of the communication terminal receiving the information, have been proposed.

Japanese Patent Application, First Publication No. Hei 3-126199 discloses a vehicle information display system which repeatedly and periodically transmits information of a user vehicle (such as information regarding a present location, a traveling direction, a speed, etc.) to other vehicles, looks up information of other vehicles (such as information regarding present locations, traveling directions, speeds, etc.) within a predetermined area with respect to the user vehicle as a center, and displays the locations, traveling directions, and speeds of the other vehicles as well as the location of the user vehicle on a displayed map based on the information received.

Japanese Patent Application, First Publication No. Hei 4-111543 discloses a navigational location system which refers to a sender information database based on a sender's telephone number in an electric wave transmitted from a pocket bell transmitter station, specifies and displays a name and an address of the sender on a display, and indicates the location of the sender on a map displayed with a mark.

Further, Japanese Patent Application, First Publication No. Hei 4-204590 discloses a vehicle navigation device, which transmits present location information of a user vehicle, receives present location information of other vehicles, and displays the present locations of the user vehicles and of the other vehicles on a displayed map based on the present location information of the other vehicles. The vehicle navigation device is constructed so that a reduced scale is selectable on the displayed map to include present locations of all other vehicles in the map.

Exchange of electronic mail by means of a network between devices such as computers has become very popular in recent years. Information included in the electronic mail is communicated in the form of a text message. When a place is specified in the electronic mail, informing the receiver of the place through the text messages is often impossible.

The systems stated above can basically handle only location information. For example, the systems have disadvantages in that the contents of the messages become deficient because they cannot transmit text messages. Further, the systems have other disadvantages in that it is impossible to communicate places having no relation to the locations of the communication devices because places in which communication to communication terminals can be made is limited to the locations of the communication terminals.

SUMMARY OF THE INVENTION

It is an object of the present invention to provide a system for transmitting and receiving electronic mail and a recording medium storing a computer program for displaying electronic mail, this system can clearly locate a place indicated by a user to a receiver through electronic mail, at a receiver communication terminal using a map.

In order to accomplish the above object, a system for transmitting and receiving electronic mail of the present invention, comprises: a text input means for entering a text of the electronic mail to be transmitted; an extracting means for extracting a character string to specify a place from the text inputted by the text input means; an adding means for adding information to the electronic mail, the information corresponding to the place specified by the extracted character string; a text display means for displaying the text in the electronic mail; and a map display means for displaying map information indicating the specified place corresponding to the information added to the electronic mail.

In another aspect of the present invention, the system further comprises: a transmitter communication terminal for transmitting the electronic mail; and a receiver communication terminal for receiving the electronic mail.

In another aspect of the present invention, the system of the present invention further comprises: a route guidance means for providing a route guidance instruction based on the information added to the electronic mail, the route guidance means being provided with the map display means. Further, the information includes coordinates data.

In another aspect of the present invention, the electronic mail is transmitted from a transmitter communication terminal via a communication center to a receiver communication terminal, the transmitter communication terminal includes the text input means, and a transmitting means for transmitting the electronic mail, the communication center includes a receiving means for receiving the electronic mail from the transmitter communication terminal, the extracting means, the adding means, and a transmitting means for transmitting the electronic mail with the added information, and the receiver communication terminal includes a receiving means for receiving the electronic mail from the communication center, the text display means, and the map display means.

In another aspect of the present invention, a system for transmitting and receiving electronic mail, comprises: a text input means for entering a text of the electronic mail to be transmitted;

a specifying means for specifying a place; an adding means for adding information to the electronic mail, the information corresponding to the specified place; a text display means for displaying the text in the electronic mail; and a map display means for displaying map information indicating the specified place corresponding to the information added to the electronic mail, wherein the electronic mail is transmitted from a transmitter communication terminal via a communication center to a receiver communication terminal, the transmitter communication terminal includes the text input means, the specifying means, the adding means, and a transmitting means for transmitting the electronic mail, the communication center includes a receiving means for receiving the electronic mail with the added information from the transmitter communication terminal, and a transmitting means for transmitting the electronic mail with the added information, and the receiver communication terminal includes a receiving means for receiving the electronic mail from the communication center, the text display means, and the map display means.

In another aspect of the present invention, the system of the present invention further comprises a map server for providing map information to the transmitter. The map server is connected to the transmitter through a communication link.

In another aspect of the present invention, the transmitter further comprises a data storage means for providing map information to the transmitter.

In another aspect of the present invention, the electronic mail is transmitted from a communication center to a receiver communication terminal, the communication center includes the text input means, the extracting means, the adding means, and a transmitting means for transmitting the electronic mail with the added information, the communication center is operated by the transmitter communication terminal through a communication link, and the receiver communication terminal includes a receiving means for receiving the electronic mail from the communication center, the text display means, and the map display means.

In another aspect of the present invention, the electronic mail is transmitted from a transmitter communication terminal to a receiver communication terminal, the transmitter communication terminal includes the text input means, the extracting means, the adding means, a data storage means for providing map information to the adding means, and a transmitting means for transmitting the electronic mail with the added information, the receiver communication terminal includes a receiving means for receiving the electronic mail through a communication link, the text display means, and the map display means.

In another aspect of the present invention, a method for processing an electronic mail message of the present invention comprises the steps of: entering a text of an electronic mail to be transmitted; extracting a character string to specify a place from the text; adding information to the electronic mail, the information corresponding to the place specified by the extracted character string; displaying the text in the electronic mail; and displaying map information indicating the specified place corresponding to the information added to the electronic mail.

In another aspect of the present invention, the method of the present invention further comprises the steps of: transmitting the electronic mail; and receiving the electronic mail.

The character strings which are extracted by the extracting means and specify a location are, for example, an address, a place name, a name of a landmark, or a telephone number. The coordinate information includes numerical value data corresponding to a latitude and a longitude of the place specified by the character strings.

When character strings indicating a place such as an address, a place name, a name of a landmark, or a telephone number are contained in texts of received electronic mail by a receiver communication terminal, a map corresponding to the location is displayed at the receiver communication terminal. For this reason, when a place specified in electronic mail is indicated to a receiver, it is possible to display the location clearly by means of a map at the receiver communication terminal.

BRIEF DESCRIPTION OF THE DRAWINGS

FIG. 4A is a flow chart showing a process in a personal computer of the first embodiment of the present invention. FIG. 4B is a flow chart showing processes in a communication center of the first to fourth embodiments of the present invention. FIG. 4C is a flow chart showing a process in the communication terminal of the first to fourth embodiments of the present invention.

FIG. 5 is a diagram showing contents of location information added to a received electronic mail in the communication center of the system for transmitting and receiving electronic mail of the first embodiment of the present invention.

FIG. 6 is a diagram showing contents displayed on a display at the communication terminal of the system for transmitting and receiving electronic mail of the present invention when the electronic mail to which location information is added is received.

DETAILED DESCRIPTION OF THE PREFERRED EMBODIMENTS

The preferred embodiments of the present invention will be described below with reference to Figures.

Figure 1:
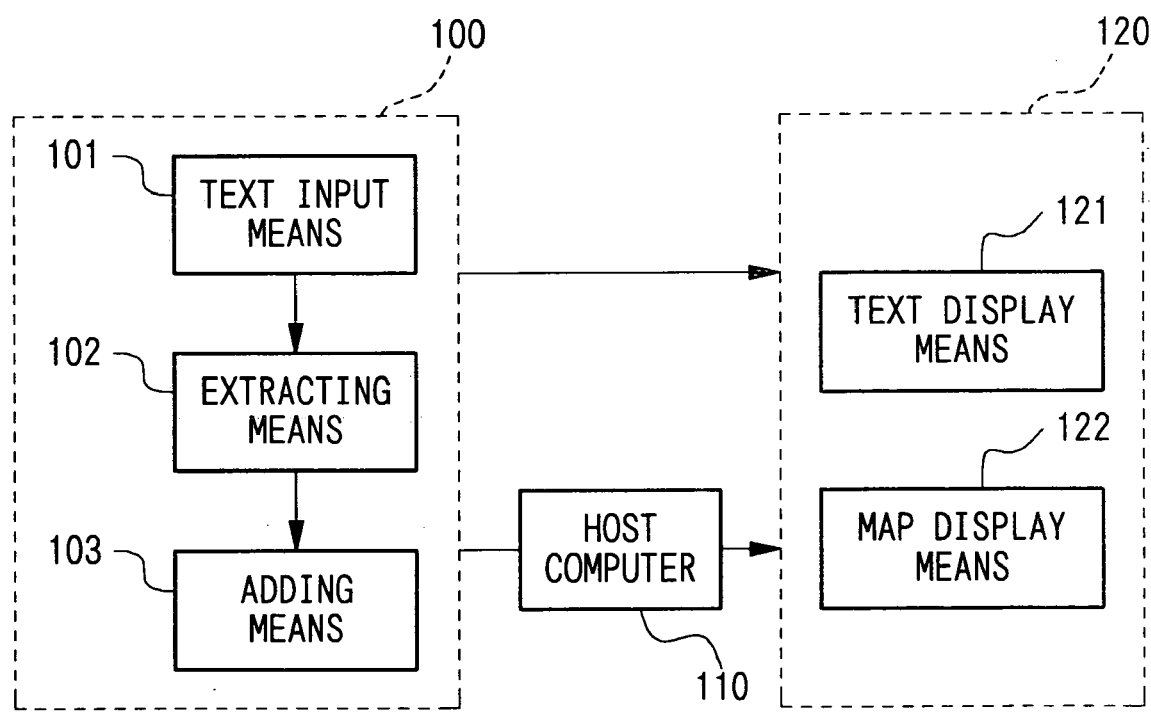
FIG. 1 is a block diagram showing a system for transmitting and receiving electronic mail (e-mail) of the present invention.

FIG. 1 shows a system for transmitting and receiving electronic mail (e-mail) of the present invention. A transmitter terminal (computer) 100 includes a text input means 101, an extracting means (a specifying means for specifying a place) 102, and an adding means 103.

The text input means 101 enters a text of an electronic mail through a personal computer publicly known, and is a keyboard for example. The extracting means 102 and the adding means 103 performs internal processes in the personal computer through which the electronic mail is inputted. The processes may be performed in a computer 120 for receiving the electronic mail, or in a host computer (center) 110 when the electronic mail is transmitted through a communication network such as the Internet.

The extracting means 102 extracts a character string to specify a place from the text inputted by the text input means, and the adding means 103 adds information to the electronic mail, this information corresponds to the place specified by the extracted character string.

The receiver terminal (computer) 120 includes a text display means 121, and a map display means 122. The text display means 121 displays the text in the received electronic mail, and the map display means 122 displays map information indicating the specified place corresponding to the information added to the electronic mail.

The invention will be explained in more detail with reference to first to fifth embodiments.

First Embodiment

Figure 2:
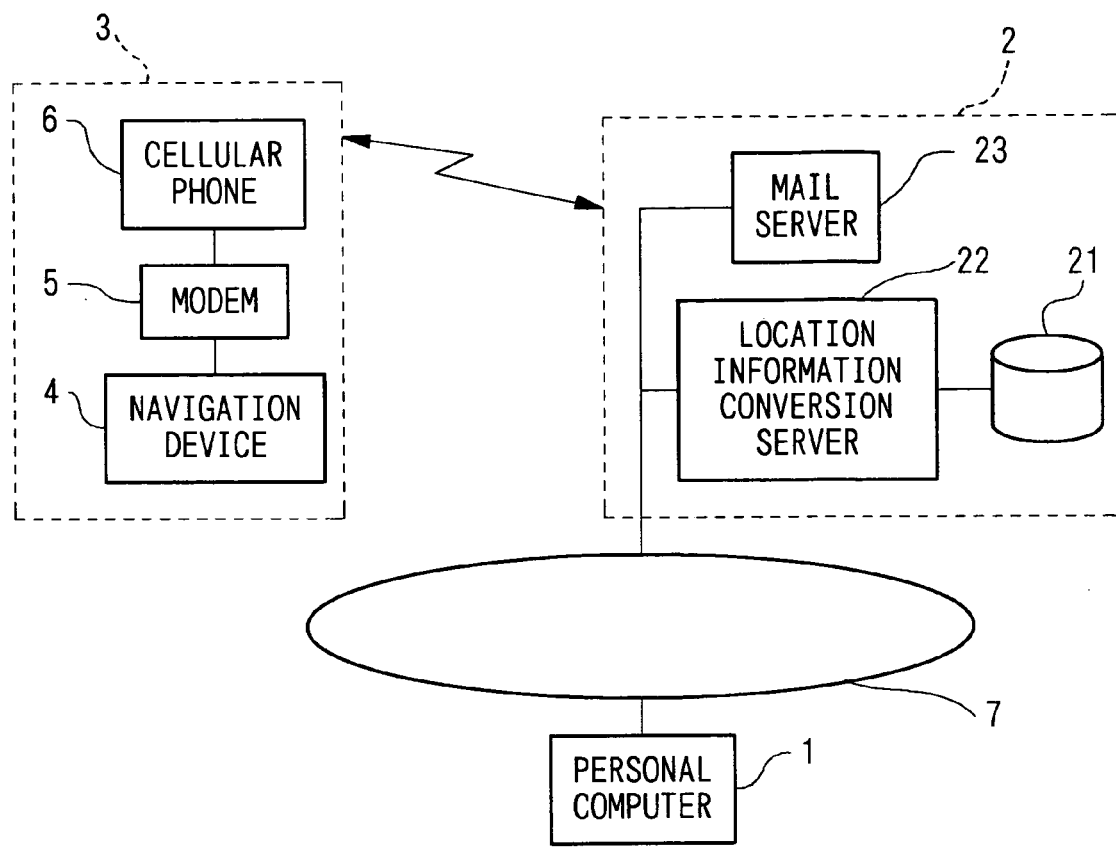
FIG. 2 is a block diagram showing a system for transmitting and receiving electronic mail of a first embodiment of the present invention.

FIG. 2 shows a construction of a system for transmitting and receiving electronic mail in accordance with a first embodiment of the present invention. In the first embodiment, the text input means is included in the personal computer 1, the extracting means and the adding means are included in the information center 2, and the text display means and the map display means are included in the communication terminal 3. Reference numeral 1 denotes a personal computer, in which a mail writing program or a mail editor for writing, displaying, transmitting, and receiving electronic mail in HTML (Hyper Text Make up Language) and a WWW (World Wide Web) browser, one of the services of the Internet, are installed. Other devices such as a modem, a CD-ROM drive, and a hard disk drive are connected to the personal computer 1.

Reference numeral 2 denotes an information center, which comprises a place name database 21 for storing place name character strings, telephone numbers, and location information corresponding thereto, a location information conversion server 22 having a place name extracting engine, and a mail server 23. When electronic mail is sent through the Internet 7, the location information conversion server 22 extracts a place name or a telephone number in the electronic mail with the place name extracting engine using the place name database 21. When the place name or the telephone number is extracted, location information corresponding to the place name or the telephone number is read from the place name database 21 and is added to the electronic mail.

The location information stored in the place name database 21 are represented by tags and attributes, which are to be newly added to HTML by this embodiment in order to enable a receiver to display a map, and includes coordinate data (latitude and longitude data).

Figure 3:
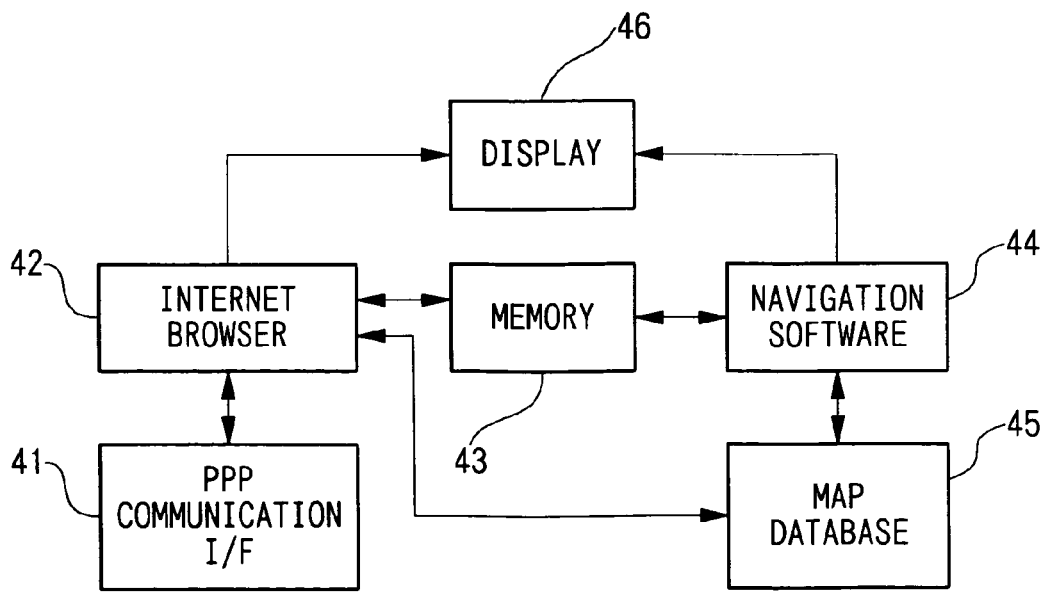
FIG. 3 is a block diagram showing an inside construction of a communication terminal in the system for transmitting and receiving electronic mail of the present invention.

Reference numeral 3 denotes a navigator with a communication function (hereinafter referred to as a communication terminal) installed in a mobile body such as a car, which comprises a navigation device 4, a modem 5, and a cellular phone 6 for exchanging electronic mail to and from an information center 2. FIG. 3 shows an inside construction of the navigation device 4. Reference numeral 41 denotes a PPP (Point-to-Point Protocol) communication interface section for establishing a connection to the information center 2, thus allowing the communication terminal 3 to access the Internet 7 through the information center 2.

Reference numeral 42 denotes an Internet browser for downloading electronic mail, which is transmitted to the communication terminal 3, from the mail server 23 in the information center 2, and for displaying the electronic mail on the display 46. When the location information is added to the downloaded electronic mail, the Internet browser 42 reads a map corresponding to the location information from the map database 45, and displays the information on the display 46 according to a user operation. Reference numeral 43 denotes a memory for storing the location information added to the downloaded electronic mail.

Reference numeral 44 denotes a navigation software for computing the shortest route from a current position of the user vehicle to a destination specified by a user, for indicating the shortest route on the display 46, and for instructing an appropriate traveling route of the vehicle. The navigation software 44 is capable of using the location information stored in the memory 43 as guidance information regarding the destination, which will be described later. The map database 45 stores map data for displaying the map on the display 46.

Figure 4A:
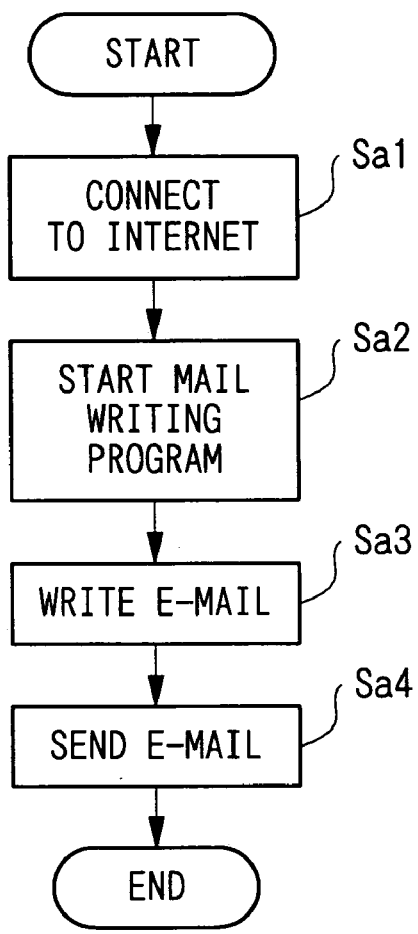
FIGS. 4A to 4C are flow charts showing steps of transmitting electronic mail by the system for communicating and receiving electronic mail of the first to fourth embodiments of the present invention.
Figure 4B:
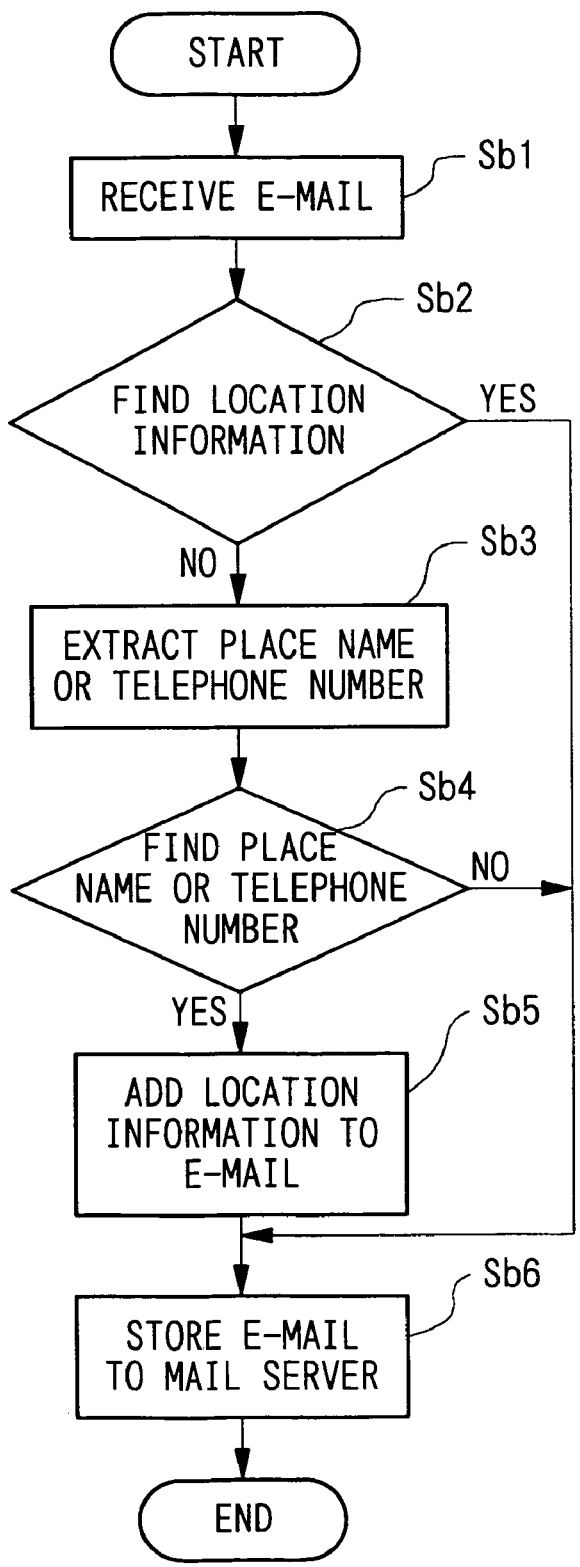
Figure 4C:
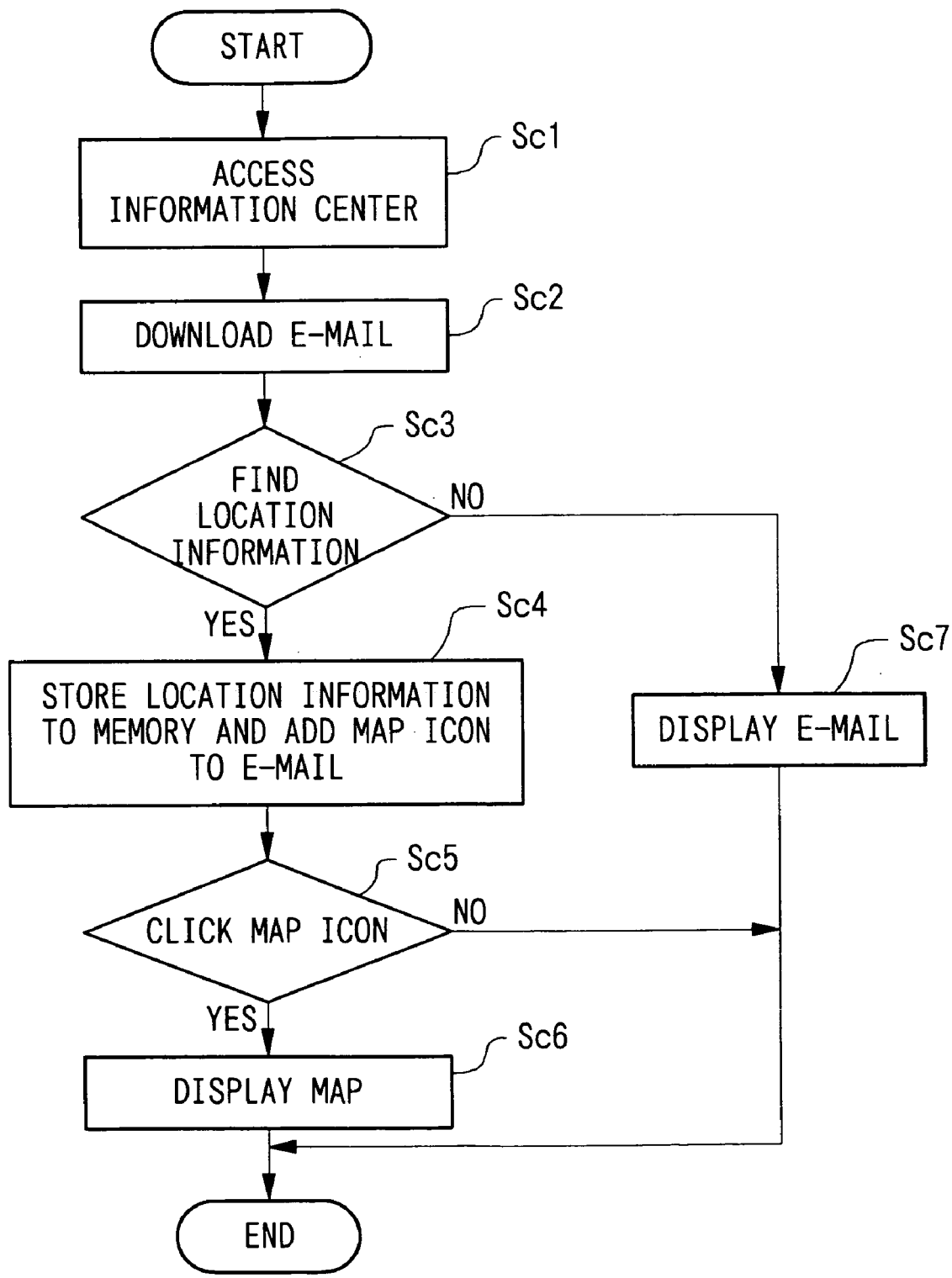

Referring now to FIGS. 4A to 4C which shows flow charts of the system for transmitting and receiving electronic mail, FIG. 4A illustrates a process of the personal computer 1, FIG. 4B illustrates a process of the information center 2, and FIG. 4C illustrates a process of the communication terminal 3. That is, FIGS. 4A to 4C illustrate the flow charts of the processes for sending electronic mail from the personal computer 1 to the communication terminal 3.

When a user of the personal computer 1 (hereinafter referred to as a sender) operates the personal computer to connect to the Internet 7 in order to send electronic mail, the process proceeds to step Sa1 in FIG. 4A. The personal computer 1 is connected to a provider through a telephone line using a modem by a PPP system. The sender starts a mail writing program (or a mail editor) (at step Sa2). After entering the texts of the electronic mail to be sent to the communication terminal 3 by a keyboard or the like, the personal computer 1 converts the entered text into a HTML file (at step Sa3).

When the sender wants to display the map which includes a desired place at the communication terminal 3, a place name, a telephone number at the place, or both of them may be inputted. For example, the sender may write: "Please come to my house. My address is House No. 1, First Street, Green City, West Prefecture, Japan." in the electronic mail.

The process proceeds to step Sa4 in response to the operation of sending electronic mail by the sender. The personal computer 1 sends the electronic mail to the information center 2 through the Internet 7.

Secondly, when the electronic mail is received at the information center 2 (at step Sb1 in FIG. 4B), the process proceeds to step Sb2, in which it is determined whether location information is contained in the received electronic mail. The process of step Sb2 is required in another embodiment described later, in which the location information is added to the electronic mail in advance by the personal computer 1 as a transmitter communication terminal. In this embodiment, the determination is "no" because the personal computer 1 sent the electronic mail without location information, and the process proceeds to step Sb3.

The location information conversion server 22 reads a few characters at a time from the electronic mail into a buffer, compares and collates them with place names and telephone numbers recorded in the place name database 21, and extracts a place name or a telephone number in the electronic mail text by means of the place name extracting engine. Extracting conditions such as synonyms, distinctions between capital letters and small letters, partial matches can be set.

At step Sb4, it is determined whether a place name or a telephone number has been extracted from the received electronic mail text at step Sb4. If the determination is "yes", the process proceeds to step Sb5, where the location information corresponding to the place name is read from the place name database 21, and is added to the received electronic mail. Referring now to FIG. 5, a representation in which the location information is added to the electronic mail is shown.

In FIG. 5, a portion A includes texts which the sender has entered by the personal computer 1, and a portion B from a beginning tag <NAVIDATA> to an ending tag </NAVIDATA> includes the location information added by the location information conversion server 22. In this location information, "name" is an attribute which defines the destination, and a mail address of the communication terminal 3 is inputted in a portion "1". "Position-latitude" and "position-longitude" are attributes which define a center position to be displayed on the display 46 of the communication terminal 3, and latitude and longitude data corresponding to "No. 1, First Street, Green City, West Prefecture, Japan" in the electronic mail, which are read from the place name database 21, are inputted in portions "2" and "3". The information to indicate an icon, which is indicated as "MAP" (described later) just after "No. 1, First Street, Green City, West Prefecture, Japan" in the electronic mail text, is also added.

After the location information is added to the electronic mail in step Sb5, the process proceeds to step Sb6, where the electronic mail to which the location information is added is stored in the mail server 23 and the process terminates.

If it is determined that the location information (or "<NAVIDATA>" tag) is contained in the electronic mail text in step Sb4, the process directly proceeds to step Sb6, where the received electronic mail is stored in the mail server 23 as is. If the received electronic mail has no place name or telephone number or the place names and the reference are not found in the place name database in step Sb4, the process directly proceeds to step Sb6 where the received electronic mail is stored in the mail server 23 as is.

When electronic mail is read at the communication terminal 3, the user of the communication terminal 3 (hereinafter referred to as a receiver) operates the communication terminal 3 to connect to the information center, and the Internet browser 42 accesses the information center 2 using the modem 5 and the cellular phone 6 by the PPP system (at step Sc1). After the identification number is verified and the receiver establishes a connection to the information center 2, the receiver operates the terminal to receive the electronic mail using the Internet browser 42 for receiving electronic mail, and the process proceeds to step Sc2 where the Internet browser 42 downloads the electronic mail addressed to the communication terminal 3 from the mail server 23 in the information center 2.

The process next proceeds to step Sc3, in which it is determined whether location information has been added to the downloaded electronic mail (that is, whether or not the "<NAVIDATA>" tag is contained in the electronic mail text). If the determination is "yes", the process proceeds to step Sc4, in which the Internet browser 42 stores the added location information together with the text data indicating the place name in the memory 43 and displays an icon represented as "MAP" (hereinafter referred to as a map icon) next to "No. 1, First Street, Green City, West Prefecture, Japan" in the electronic mail text (see FIG. 6). The contents of the added location information, that is the character strings from <NAVIDATA> to </NAVIDATA>, are not displayed on the display 46.

When the receiver clicks the MAP icon, the process proceeds to step Sc6, in which the Internet browser reads the map data corresponding to the latitude and the longitude data in the location information from the map database 45 based on the location information corresponding to the clicked MAP icon, and displays the map data on the display 46. The map image is displayed on the display 46 on a preselected reduced scale with a center at the place "No. 1, First Street, Green City, West Prefecture, Japan".

If it is determined that location information has not been added to the electronic mail downloaded in step Sc3, the determination is "no", and the process proceeds to step Sc7 in which the downloaded electronic mail is displayed on the display according to tags and attributes generally defined in a HTML.

By installing the place name database 21 in the communication terminal 3 and by programming the map extracting engine, which is installed in the location information conversion server 22 of the information center 2 in this embodiment, within the Internet browser 42, display of a map corresponding to a place name or a telephone number contained in the electronic mail text on the display 46 is possible even when normal electronic mail with no location information is received.

When the communication terminal 3 receives the electronic mail which contains the character strings corresponding to the place name or the telephone number, the character strings are extracted, and the location information corresponding to the extracted character strings is read from the place name database 21 and is added to the received electronic mail. The electronic mail is thus displayed on the display 46, together with the MAP icon added just after the character strings corresponding to the place name or the telephone number. When the MAP icon is clicked, the map corresponding to the place name or the telephone number is displayed on the display 46.

When the receiver uses a destination guidance function of the navigation software 44, the location information stored in the memory 43 can be used as destination guidance information. When the receiver starts the navigational software and sets up a destination in the guidance, the navigation software 44 displays a list which includes the place names stored in the memory 43. When one of the place names in the list is selected by the receiver, the navigation software 44 regards the latitude and longitude data corresponding to the selected place name as a destination, calculates the shortest route, and provides guidance instruction regarding the traveling route of the vehicle.

Thus, in the first embodiment of the communicating system for transmitting and receiving electronic mail, when the sender inputs a place name in the electronic mail text, the receiver can see a map image corresponding to the place name, thereby clearly indicating the place which the sender wants to show the receiver. When the electronic mail to be transmitted includes only text data, the data size can be greatly decreased, compared with electronic mail having image data of a map which includes the place the sender wants to show to the receiver, thereby reducing transmitting time.

Second Embodiment

In the first embodiment of the communicating system for transmitting and receiving electronic mail, the location information is added to the transmitted electronic mail in the information center 2. In a second embodiment of the invention, the sender adds location information to the electronic mail by himself and transmits the electronic mail to the information center 2. That is, in the second embodiment, the text input means, the specifying means, and the adding means are included in the personal computer 1, and the text display means and the map display means are included in the communication terminal 3.

Figure 7:
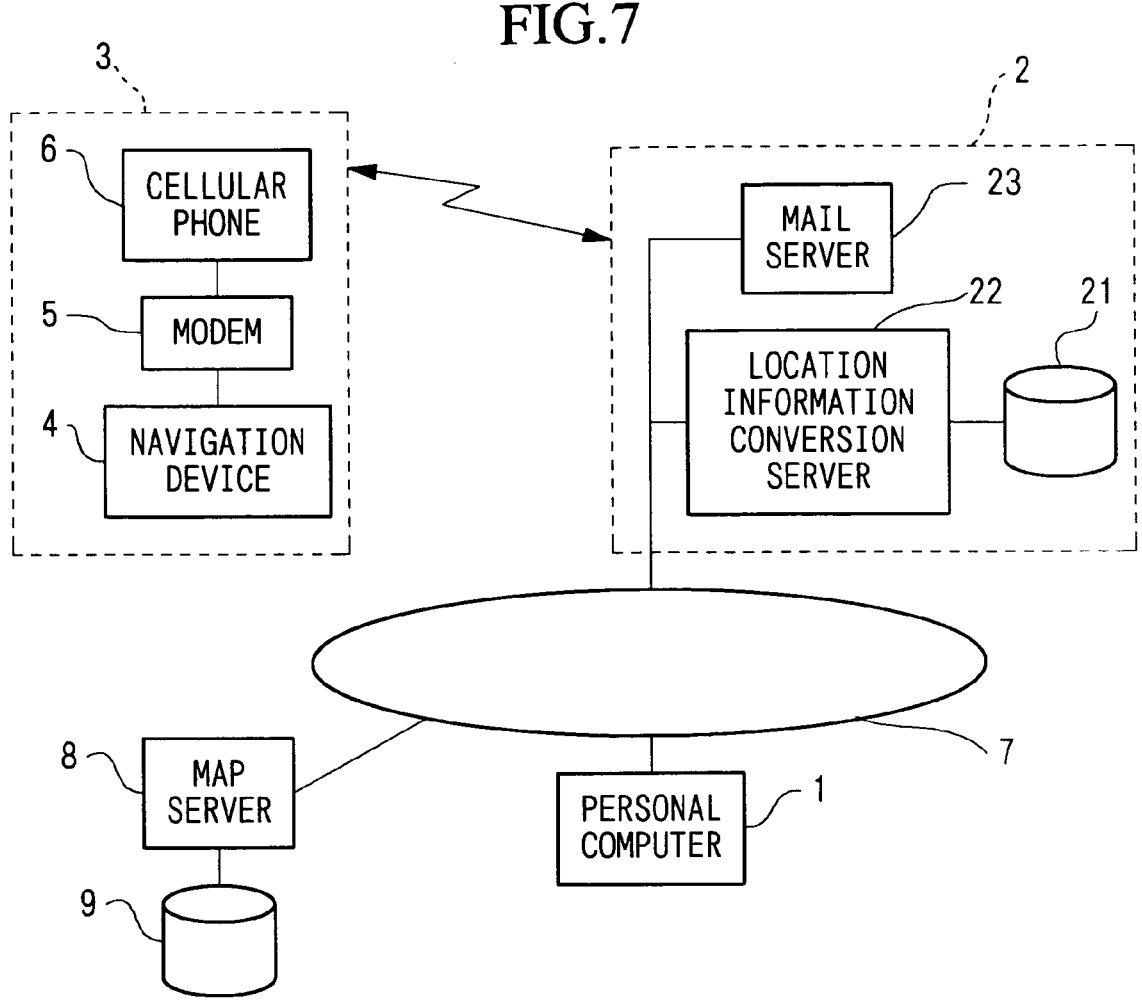
FIG. 7 is a block diagram showing the system for transmitting and receiving electronic mail of a second embodiment of the present invention.

FIG. 7 shows a construction of a communicating system for transmitting and receiving electronic mail in accordance with the second embodiment of the present invention. Reference numerals which are identical to those in FIG. 2, respectively, indicate elements which are identical to those in FIG. 2; therefore, explanation thereof will be omitted. A difference between the systems for transmitting and receiving electronic mail in FIGS. 2 and 7 is that a map server 8 which provides map information in response to inquiry from the Internet 7 is connected.

Figure 8:
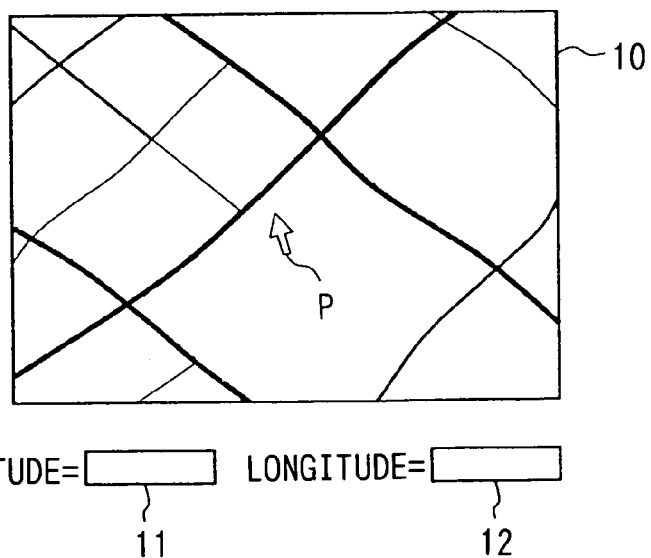
FIG. 8 is a pictorial representation explaining the contents of a page for providing location information in a map server in the system for transmitting and receiving electronic mail of the present invention.

In the system for transmitting and receiving electronic mail in FIG. 7, a process of entering electronic mail by means of the personal computer 1 will be explained. The user (sender) of the personal computer 1 accesses the map server 8 through the Internet using the WWW browser. After having accessed the map server 8, a picture shown in FIG. 8 is displayed on a monitor of the personal computer 1.

The sender moves a pointer P on a map displayed in a map indication area 10 using a mouse, and clicks a point corresponding to location information which the sender wishes to obtain. The map server 8 reads latitude and longitude data corresponding to the clicked point from a place name database 9, and displays the data in a latitude data indication field 11 and a longitude data indication field 12.

According to the manner shown in FIG. 5, the sender enters <NAVIDATA> tag in a position next to a place name inputted in electronic mail, a mail address of a receiver as an attribute "name", and the latitude and longitude data obtained from the map server 8 as attributes "position-latitude" and "position-longitude". After the mail is completed, the sender sends the electronic mail to the information center 2 by means of a mail writing program (or a mail editor).

As explained in the first embodiment of this invention, when the electronic mail is received at the information center 2 (at step Sb1 in FIG. 4B), it is determined that location information is contained in the received electronic mail. The process proceeds to step Sb6, and the received electronic mail is stored in the mail server 23 as is. When the electronic mail is read at the communication terminal 3, the process illustrated in FIG. 4C is performed, and the electronic mail is displayed on the display 46 of the communication terminal as illustrated in FIG. 6. If the MAP icon is clicked, a map is displayed on the display 46 according to the latitude and longitude data as the location information contained in the electronic mail.

In the second embodiment of this invention, the sender himself adds the location information to the electronic mail, so that the receiver can display the map corresponding to the place name contained in the text of the electronic mail by means of a conventional mail server.

Third Embodiment

In the system for transmitting and receiving electronic mail of the second embodiment, when the sender adds the location information to the electronic mail, the necessary latitude and longitude data are received from the map server 8 through the Internet. In a third embodiment of the invention, the user can receive necessary latitude and longitude data using a personal computer 1 from a place name database and from an application software (map application), which are recorded in a CD-ROM or the like and which work in a fashion similar to the map server 8. In the third embodiment, a hardware construction of the system for transmitting and receiving electronic mail is the same as that shown in FIG. 2. That is, in the third embodiment, the text input means, the specifying means, and the adding means are included in the personal computer 1, and the text display means and the map display means are included in the communication terminal 3.

When the map application recorded in the CD-ROM is started in the personal computer 1, a picture shown in FIG. 8 is displayed on a monitor of the personal computer 1. When the sender moves the pointer P using a mouse and clicks a point corresponding to location information which the sender wishes to obtain, the map application reads the latitude and longitude data corresponding to the clicked point from the place name database recorded in the CD-ROM, and displays the latitude and longitude data in a latitude data indication field 11 and in a longitude data indication field 12.

When the sender writes electronic mail according to the process illustrated in the second embodiment and transmits the electronic mail to the mail server in the information center 2, the electronic mail is displayed at the communication terminal 3 as illustrated in FIG. 6. When the MAP icon is clicked, a map according to the latitude and longitude data of the location information contained in the electronic mail is displayed.

In the third embodiment of the invention, it is possible to receive the necessary latitude and longitude data corresponding to the desired place even if the map server 8 shown in FIG. 7 is not connected to the Internet 7.

Fourth Embodiment

As described in the first to third embodiments, the electronic mail is written through the personal computer 1. In a fourth embodiment, electronic mail is written using a mail transmitting page installed in the information center 2, that is, on the side of the information center 2. In the fourth embodiment, the hardware construction of the system for transmitting and receiving electronic mail is the same as that shown in FIG. 2. That is, in the fourth embodiment, the text input means, the extracting means, and the adding means are included in the information center 2, and the text display means and the map display means are included in the communication terminal 3.

Figure 9:
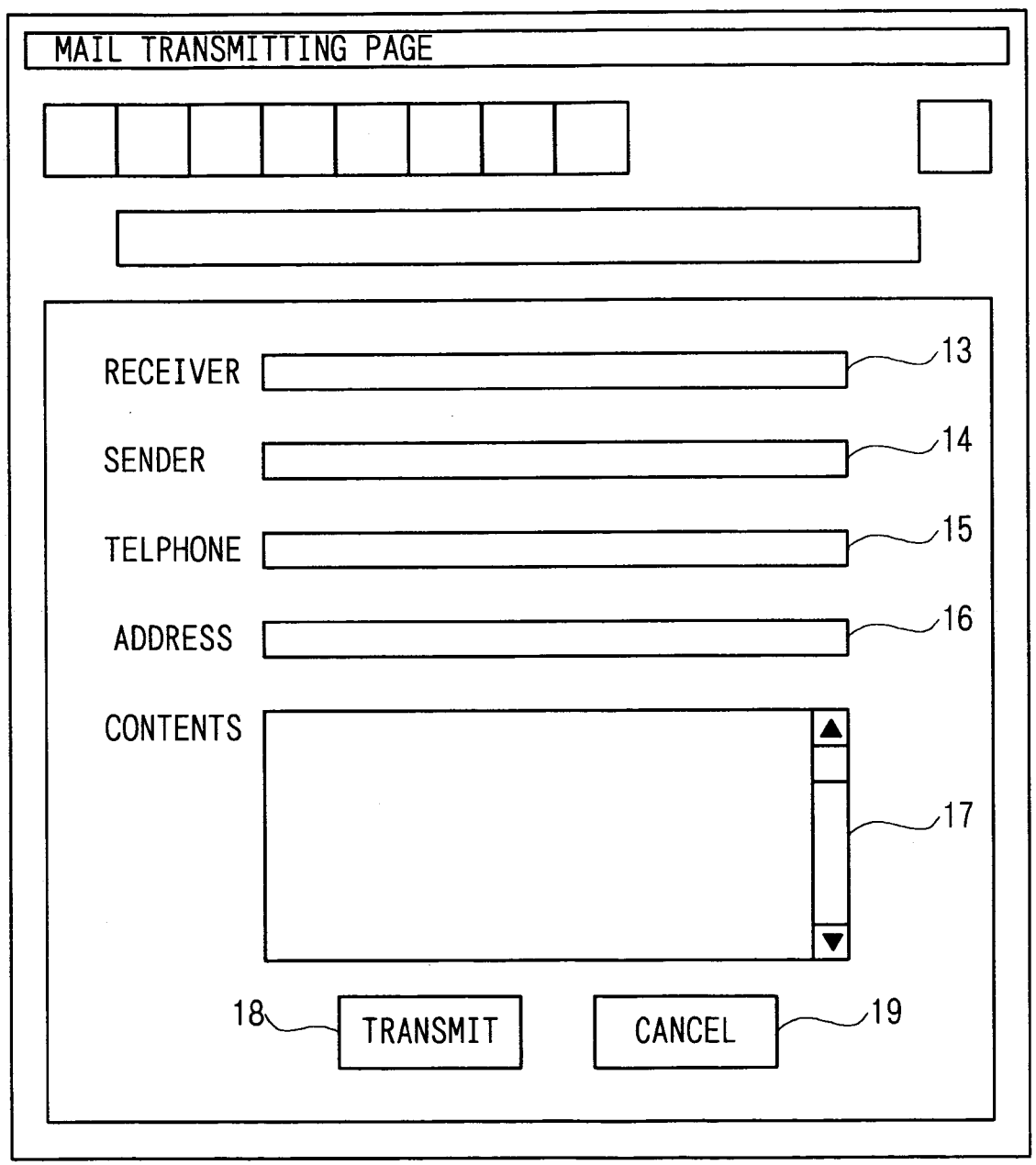
FIG. 9 is a pictorial representation showing the contents of a page for transmitting electronic mail in an information center of the fourth embodiment of the present invention.

To achieve this, the mail transmitting page shown in FIG. 9 is programmed in a Web page of the information center 2. FIG. 9 is a pictorial representation of the mail transmitting page indicated through the WWW browser installed in the personal computer 1. In FIG. 9, reference numeral 13 denotes a receiver address field in which a mail address of a receiver of the electronic mail is entered using a keyboard or the like of the personal computer 1. Reference numeral 14 denotes a sender field in which a name of a sender is entered. Reference numeral 15 denotes a telephone number field in which a telephone number of the sender is entered. Reference numeral 16 denotes a sender address field in which the sender's telephone number is entered. Reference numeral 17 denotes a text field in which mail texts to be transmitted is entered.

Reference numeral 18 denotes a transmitting button, and if it is clicked by a mouse or the like, the texts entered in each field are converted into a HTML file. Reference numeral 19 denotes a cancel button, and if it is clicked by the mouse or the like, the text entered in each field is cleared.

In this embodiment, when the sender transmits electronic mail to the communication terminal 3, the sender accesses the mail transmitting page of the information center 2 using the WWW browser in the personal computer 1. Next, the sender enters the necessary matters in each field, and clicks the transmitting button 18 when he determines that there is no mistakes in the entered matters. Electronic mail which has the same contents as the contents entered on the mail transmitting page is produced in the information center 2, and is further processed as shown in FIG. 4B.

The location information conversion server 22 extracts a place name or a telephone number from text entered in the text field 17. If the place name or the telephone number has been entered, the corresponding location information is read from the place name database 21 and is added to the electronic mail, and the electronic mail is stored in the mail server 23. When the personal electronic mail is downloaded, the communication terminal 3 processes the electronic mail as shown in FIG. 4C, and the map corresponding to the place name or the telephone number in the text of the electronic mail is indicated according to the receiver's operation.

Fifth Embodiment

A fifth embodiment of the system for transmitting and receiving electronic mail will be explained with reference to FIGS. 10 to 12. In the first to fourth embodiments, the electronic mail is transmitted and received between the personal computer and the communication terminal through the Internet and the communication center. In the fifth embodiment, electronic mail is transmitted and received between the personal computer and the communication terminal. In the fifth embodiment, the text input means, the extracting means, and the adding means are included in the personal computer 50, and the text display means and the map display means are included in the communication terminal 60.

Figure 10:
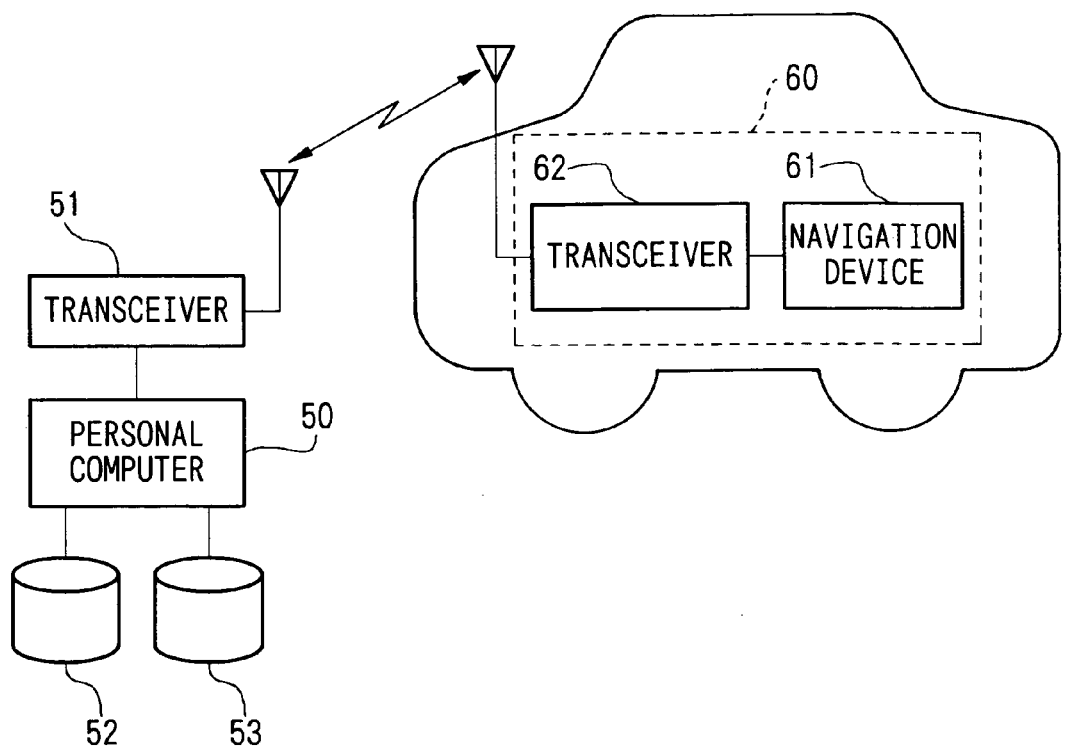
FIG. 10 is a diagram showing the system for transmitting and receiving electronic mail of a fifth embodiment of the present invention.
Figure 11:
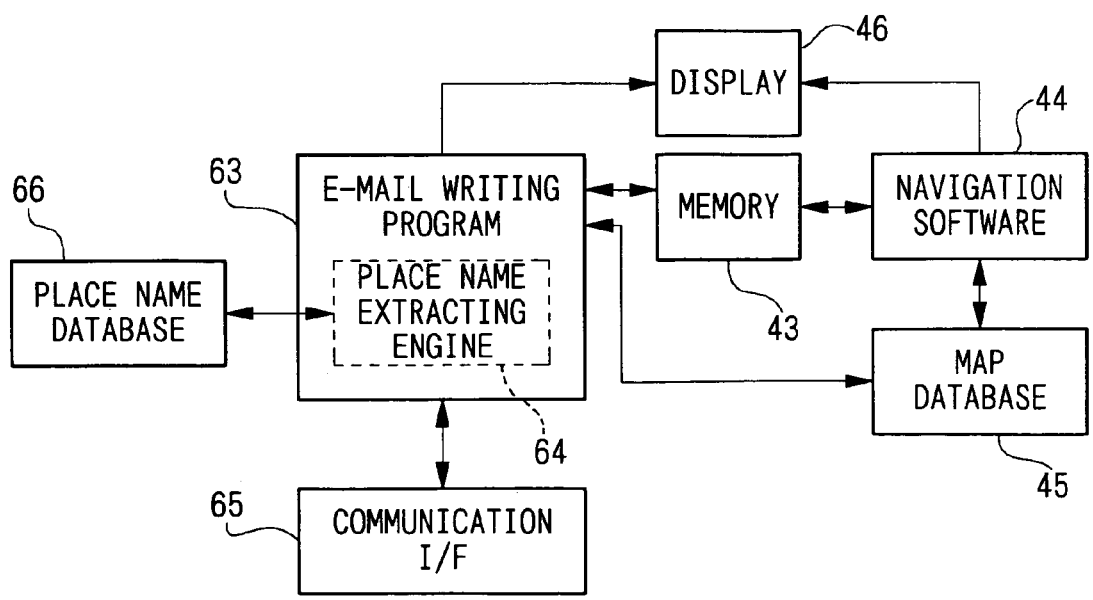
FIG. 11 is a block diagram of an inside construction of a communication terminal in the system for transmitting and receiving electronic mail of the fifth embodiment of the present invention.

FIG. 10 shows a construction of the system for transmitting and receiving electronic mail of the fifth embodiment of the present invention. Reference numeral 50 denotes a personal computer which includes storage devices such as a CD-ROM drive and a hard disk drive. An electronic mail writing program supplied from a storage device such as a CD-ROM, and a communication program for transmitting and receiving electronic mail between the personal computer 50 and a communication terminal 60, which will be explained later, are installed in the personal computer 50.

Reference numeral 51 denotes a transceiver, which transmits and receives electronic mail to and from the communication terminal 60 in the control of the communication program installed in the personal computer 50. Reference numeral 52 denotes a place name database which has the same construction as the place name database 21 explained in the first embodiment. The place name database stores character strings of place names, telephone numbers, and location information corresponding to the place names and the telephone numbers. Reference numeral 53 denotes a map database, which stores map information of various places.

A place name extracting engine and a displaying control program are installed in the personal computer 50. The place name extracting engine extracts a place name or a telephone number from texts of electronic mail received by the communication program supplied by a storage device such as a CD-ROM, looks up location information corresponding to the extraction result in the place name database 52, and adds the location information to the received electronic mail, in a fashion similar to the electronic mail writing program and the communication program. The displaying control program displays the electronic mail received by the communication program on a monitor, and refers to the map database 53 based on the location information and displays a map on the monitor (not shown) when location information is added to the electronic mail received by the place name extracting engine.

The communication terminal 60 comprises a transceiver 51 for performing data communication, and a navigation device 61 which has the same construction as the navigation device 4 in the first embodiment. In the fifth embodiment of this invention, the navigation device 61 can transmit and receive electronic mail directly between the personal computer 50. FIG. 11 shows a construction within the navigation device 61. Reference numerals which are identical to those in FIG. 3, respectively, indicate elements which are identical to those in FIG. 3; therefore, explanation thereof will be omitted. A difference between the navigation devices in FIGS. 3 and 11 will be described in the following.

Reference numeral 63 denotes an electronic mail writing program, which is controlled by input devices such as a keyboard and a mouse. The electronic mail writing program 63 enables a user to write electronic mail, transmits the electronic mail from the transceiver 62 to the personal computer 50 through the interface (I/F) 65, and displays the electronic mail received by the transceiver 62 on a display 46.

The electronic mail writing program 63 has a place name extracting engine 64 which has the same construction as the place name extracting engine explained in the fourth embodiment, extracts a place name or a telephone number from the text of the received electronic mail using a place name database 66, reads location information corresponding to the extracted character strings from a place name database 66, and adds the location information to the electronic mail. Further, when the location information is added to the received electronic mail by the place name extracting engine 64, the electronic mail writing program 63 reads a map corresponding to the location information from a map database 45 according to a user operation, and displays the map on the display 46.

Figure 12:
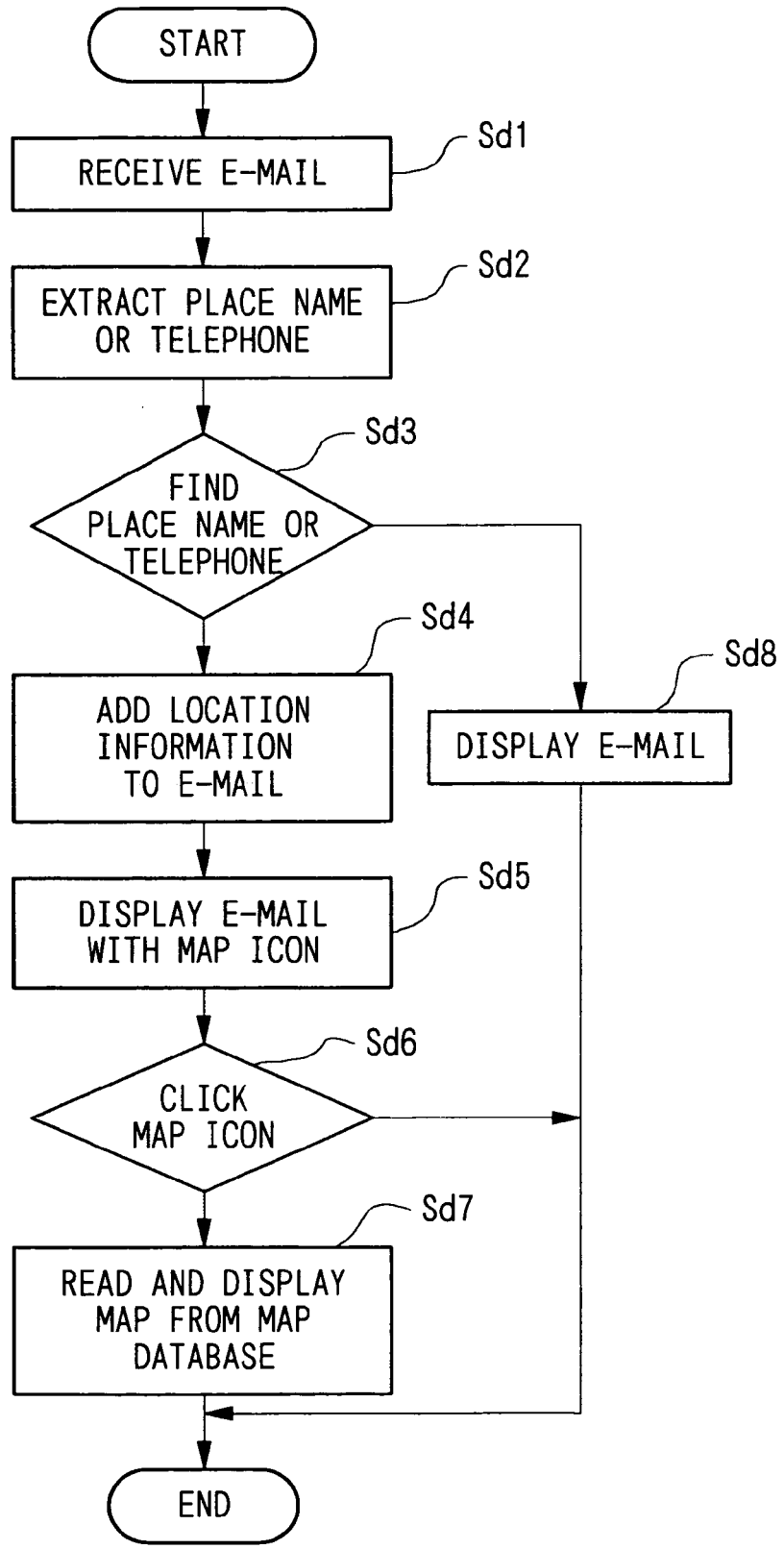
FIG. 12 is a flow chart showing a process for receiving electronic mail in a navigation device of the communication terminal of the fifth embodiment.

FIG. 12 is a flow chart showing a method of the navigation device 61 in the system for transmitting and receiving electronic mail of the present invention when the communication terminal 60 receives the electronic mail transmitted from the personal computer 50.

Electronic mail is written through the personal computer with the electronic mail writing program, and the electronic mail is transmitted from the transceiver 51 by the electronic mail communication program. For example, the text of the electronic mail may be "Please come to my house. My address is House No. 1, First Street, Green City, West Prefecture, Japan."

When the electronic mail is received by the transceiver 62 of the communication terminal 60, and when the electronic mail writing program 63 detects the reception (at step Sd1), the process proceeds to step Sd2, in which the place name extracting engine 64 reads a few characters of the text at a time from the received electronic mail into the buffer, and compares and collates them with place names and telephone numbers recorded in the place name database 52.

The process proceeds to step Sd3, in which it is determined whether the place name or a telephone number has been extracted from the received electronic mail text. If the determination is "yes", the process proceeds to step Sd4, where the location information corresponding to the place name (as shown in FIG. 5) is read from the place name database 52, and is added to the received electronic mail. The process proceeds to step Sd5, and the electronic mail writing program 63 displays the received electronic mail on a monitor, and indicates the MAP icon just after "House No. 1, First Street, Green City, West Prefecture, Japan." in the electronic mail text (as shown in FIG. 6).

The process proceeds to step Sd6, in which it is determined whether the MAP icon has been clicked. If it is determined that the MAP icon has been clicked, the process proceeds to step Sd7, in which the map data corresponding to the latitude and the longitude data in the location information are read from the map database 53 based on the location information corresponding to the clicked MAP icon, and are displayed on the monitor.

If a place name or a telephone number is not extracted from the text of the received electronic mail by the place name extracting engine 64 or if references are not found in the place name database in step Sd3, the determination is "no", and the process proceeds to step Sd8, in which the received electronic mail is displayed on the monitor according to tags and attributes generally defined in a HTML.

If the electronic mail is entered by the electronic mail writing program 63 and if the entered electronic mail is transmitted from the transceiver 62 to the personal computer 50, the same process as that shown in the flow chart in FIG. 12 is performed by the communication program installed in the personal computer 50, the place name extracting engine, and the displaying control program. Thus, the electronic mail is displayed on the monitor of the personal computer 50.

Although the system for transmitting and receiving electronic mail in the fifth embodiment does not need the communication center explained in the first to fourth embodiments, the map displaying function explained in these embodiments is provided.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

What is claimed is:

1. A navigation system for a vehicle comprising:
a text input means for entering a text of an electronic mail to be transmitted;
an extracting means for extracting a character string specifying a place from said text of said electronic mail inputted by said text input means;
an adding means for adding information to said electronic mail, said information corresponding to said place specified by said extracted character string;
a text display means for displaying said text in said electronic mail;
a map display means for displaying map information indicating said specified place corresponding to said information added to said electronic mail; and
a route guidance means for providing a route guidance instruction based on said information added to said electronic mail, said route guidance means being provided with said map display means.

2. A system according to claim 1, further comprising: a transmitter communication terminal for transmitting said electronic mail; and a receiver communication terminal for receiving said electronic mail.

3. A system of claim 2 wherein the transmitter communication terminal and the receiver communication terminal are mounted in a vehicle.

4. A system according to claim 1, wherein said information includes coordinate data.

5. A system according to claim 1, wherein said electronic mail is transmitted from a transmitter communication terminal via a communication center to a receiver communication terminal,
said transmitter communication terminal including said text input means, and a transmitting means for transmitting said electronic mail,
said communication center including a receiving means for receiving said electronic mail from said transmitter communication terminal, said extracting means, said adding means, and a transmitting means for transmitting said electronic mail with said added information,
said receiver communication terminal including a receiving means for receiving said electronic mail from said communication center, said text display means, and said map display means.

6. A system according to claim 1, wherein said electronic mail is transmitted from a communication center to a receiver communication terminal,
said communication center including said text input means, said extracting means, said adding means, and a transmitting means for transmitting said electronic mail with said added information, said communication center being operated by said transmitter communication terminal through a communication link,
said receiver communication terminal including a receiving means for receiving said electronic mail from said communication center, said text display means, and said map display means.

7. A system according to claim 1, wherein said electronic mail is transmitted from a transmitter communication terminal to a receiver communication terminal,
said transmitter communication terminal including said text input means, said extracting means, said adding means, a data storage means for providing map information to said adding means, and a transmitting means for transmitting said electronic mail with said added information,
said receiver communication terminal including a receiving means for receiving said electronic mail through a communication link, said text display means, and said map display means.

8. A navigation system for a vehicle comprising:
a text input means for entering a text of an electronic mail to be transmitted;
a specifying means for specifying a place;
an adding means for adding information to said electronic mail, said information corresponding to said specified place;
a text display means for displaying said text in said electronic mail;
a map display means for displaying map information indicating said specified place corresponding to said information added to said electronic mail; and
a route guidance means for providing a route guidance instruction based on said information added to said electronic mail, said route guidance means being provided with said map display means, wherein said electronic mail is transmitted from a transmitter communication terminal via a communication center to a receiver communication terminal, said transmitter communication terminal including said text input means, said specifying means, said adding means, and a transmitting means for transmitting said electronic mail, said communication center including a receiving means for receiving said electronic mail with said added information from said transmitter communication terminal, and a transmitting means for transmitting said electronic mail with said added information, and said receiver communication terminal including a receiving means for receiving said electronic mail from said communication center, said text display means, and said map display means.

9. A system according to claim 8, further comprising a map server for providing map information to said transmitter, said map server being connected to said transmitter through a communication link.

10. A system according to claim 8, wherein said transmitter further comprises a data storage means for providing map information to said transmitter.

11. A method-for navigating a vehicle comprising the steps of:
 entering a text of an electronic mail to be transmitted;
 extracting a character string to specify a place from said text of said electronic mail;
 adding information to said electronic mail, said information corresponding to said place specified by the extracted character string;
 displaying said text in said electronic mail;
 displaying map information indicating said specified place corresponding to said information added to said electronic mail; and
 a route guidance means for providing a route guidance instruction based on said information added to said electronic mail, said route guidance means being provided with said map display means.

12. A method according to claim 11, further comprising the steps of
 transmitting said electronic mail; and
 receiving said electronic mail.

13. A computer readable medium containing program instructions for performing the steps comprising:
 extracting a character string specifying a place from a text of an electronic mail;
 adding information to said electronic mail, said information corresponding to said place specified by said extracted character string;
 displaying said text in said electronic mail;
 displaying map information indicating said specified place corresponding to said information added to said electronic mail; and
 a route guidance means for providing a route guidance instruction based on said information added to said electronic mail, said route guidance means being provided with said map display means.

14. A navigation system for a vehicle comprising:
 a text input means for entering a text of an electronic mail to be transmitted;
 a specifying means for specifying a place;
 an adding means for adding information to said electronic mail, said information corresponding to said place specified by said extracted character string;
 a text display means for displaying said text in said electronic mail;
 a map display means for displaying map information indicating said specified place corresponding to said information added to said electronic mail; and
 a route guidance means for providing a route guidance instruction based on said information added to said electronic mail, said route guidance means being provided with said map display means.

15. A system according to claim 14, wherein said specifying means is an extracting means for extracting a character string to specify a place from said text inputted by said text input means.

* * * * *